(12) United States Patent
Zimmer

(10) Patent No.: US 6,406,089 B1
(45) Date of Patent: Jun. 18, 2002

(54) WINDSCREEN WIPER ARRANGEMENT

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,005

(22) PCT Filed: May 25, 2000

(86) PCT No.: PCT/DE00/01696

§ 371 (c)(1),
(2), (4) Date: Mar. 15, 2001

(87) PCT Pub. No.: WO00/73108

PCT Pub. Date: Dec. 7, 2000

(30) Foreign Application Priority Data

Jun. 2, 1999 (DE) .......................... 199 25 291

(51) Int. Cl.⁷ ............................... B60J 7/00; A47L 1/00
(52) U.S. Cl. ................... 296/192; 296/96.17; 15/250.3; 15/250.31
(58) Field of Search ............................. 296/192, 96.17, 296/194, 203.02; 15/250.3, 250.31, 250.29

(56) References Cited

U.S. PATENT DOCUMENTS

| | | | | |
|---|---|---|---|---|
| 5,261,286 A | * | 11/1993 | Hayashi | 15/250.3 |
| 5,507,585 A | * | 4/1996 | Diederich et al. | 15/250.3 |
| 5,549,286 A | * | 8/1996 | Vacca | 15/250.3 |
| 5,634,726 A | * | 6/1997 | Edele et al. | 15/250.3 |
| 5,675,862 A | * | 10/1997 | Reinl | 15/250.31 |
| 5,774,928 A | * | 7/1998 | Schitter et al. | 15/250.34 |
| 5,820,286 A | * | 10/1998 | Karl et al. | 403/256 |
| 5,956,800 A | * | 9/1999 | Morin et al. | 15/250.31 |
| 5,960,512 A | * | 10/1999 | Schael et al. | 15/250.31 |
| 6,044,518 A | * | 4/2000 | Kiso | 15/250.3 |
| 6,101,664 A | * | 8/2000 | Egner-Walter et al. | 15/250.3 |
| 6,196,752 B1 | * | 3/2001 | Komiyama | 15/250.31 |
| 2001/0011831 A1 | * | 8/2001 | Ohashi et al. | 296/96.17 |

FOREIGN PATENT DOCUMENTS

| | | |
|---|---|---|
| DE | 74 34 119 | 2/1975 |
| DE | 29 20 899 C2 | 1/1988 |
| EP | 0 814 004 A | 12/1997 |
| FR | 2 767 293 A | 2/1999 |
| FR | 2 770 880 A | 5/1999 |
| WO | WO94/05532 | * 3/1994 |

OTHER PUBLICATIONS

Patent Abstracts of Japan vol. 1999, No. 08, Jun. 30, 1999 & JP 11 059334 A, Mar. 2, 1999.

* cited by examiner

*Primary Examiner*—Ken Patel
(74) *Attorney, Agent, or Firm*—Michael J. Striker

(57) ABSTRACT

The invention is based on a windshield wiper system having at least one wiper bearing that is secured to a body of a vehicle via at least one bracing region (20). It is proposed that the bearing housing (10) of the wiper bearing has three bracing regions (20, 22, 24), specifically a first bracing region (20), which includes a longitudinal axis (18) of the bearing housing (10) and is provided on an end that is oriented toward a wiper, and a second bracing region (22) and third bracing region (24), which are provided axially offset toward the other end relative to the first bracing region and are disposed approximately diametrically opposite one another with regard to the longitudinal axis (18) of the bearing housing (10).

15 Claims, 2 Drawing Sheets

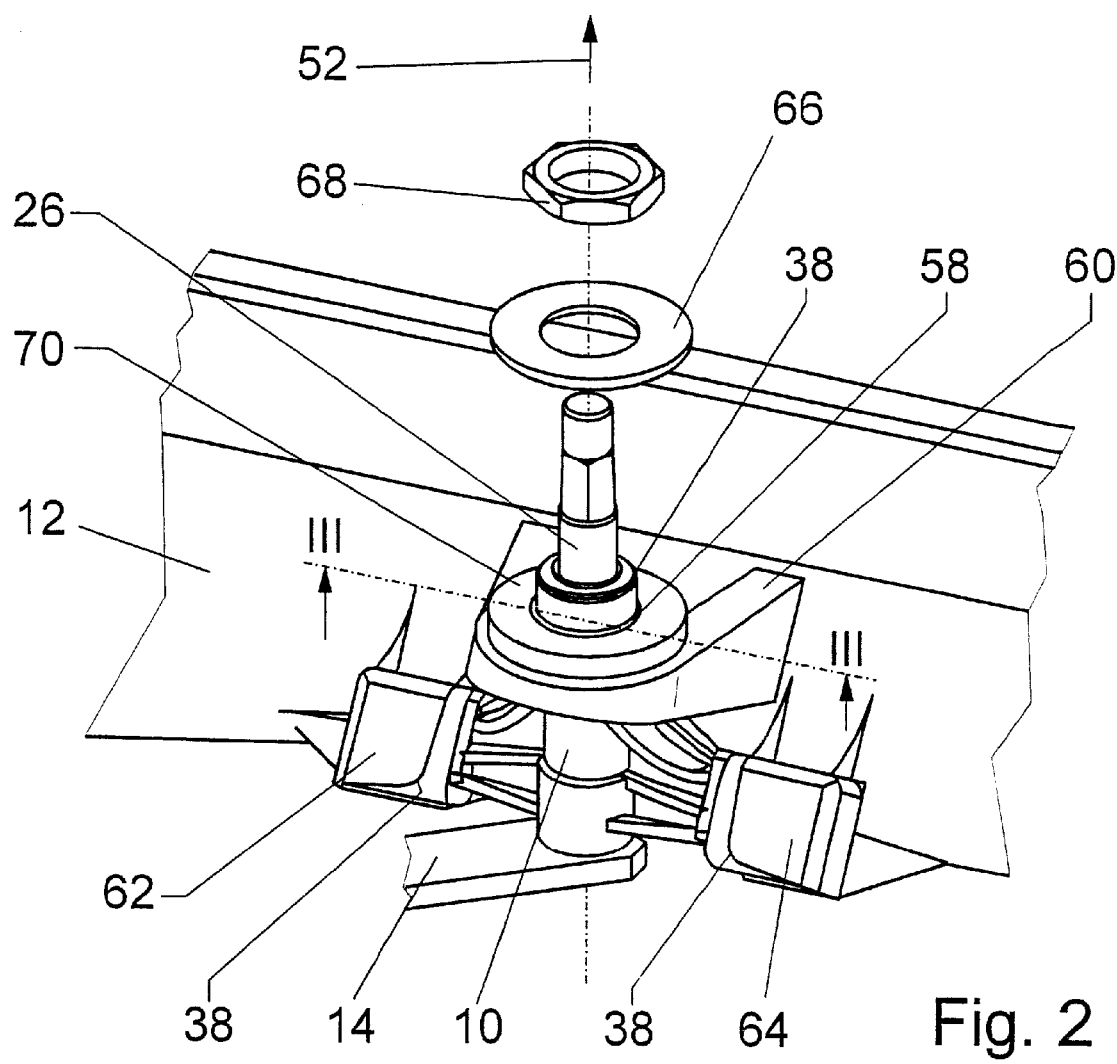
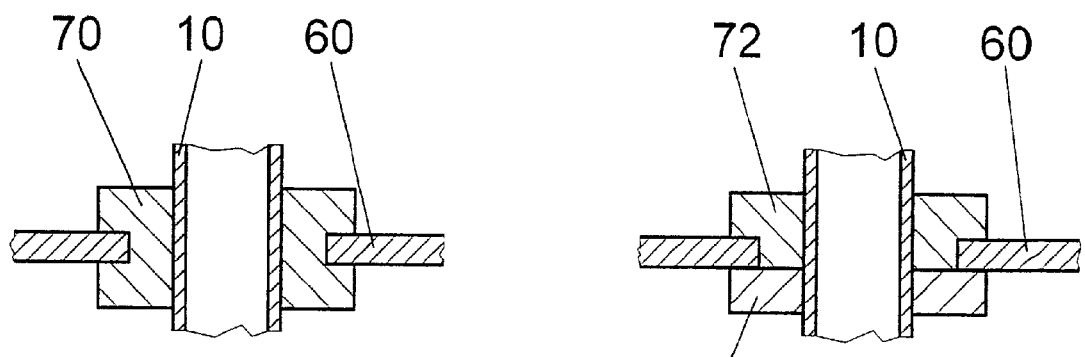
Fig. 2
Fig. 3   Fig. 4

WINDSCREEN WIPER ARRANGEMENT

BACKGROUND OF THE INVENTION

Windshield wiper systems for motor vehicles are as a rule secured to the body of a motor vehicle with a wiper carrier, that is, a so-called mounting plate or tubular mount—if the wiper carrier also comprises tubes. The mounting plate carries a wiper drive mechanism with a wiper motor and a gear, built onto it, whose power takeoff shaft as a rule via a crank and connecting rods drives cranks which are solidly connected to a drive shaft for each windshield wiper. The mounting plate determines the position of the wiper motor relative to wiper bearings, in which the drive shafts of the windshield wipers are supported. It also absorbs the forces dictated by the wiper drive mechanism.

The bearing housings of the wiper bearings are fastened or formed onto the ends of the mounting plate. The mounting plate is secured directly to a vehicle body via the bearing housing, or via fastening eyelets that are formed onto the bearing housing, the mounting plate, and/or the motor mounting plate. In each case, however, additional components are required in order to connect the windshield wiper system to the vehicle body in a largely vibration-free, torsion- resistant way.

If the mounting plates are put together from many components, this means numerous interfaces with attendant tolerances. An imprecise adjustment of the angular locations and positions of the wiper bearings relative to the wiper motor and/or the wiper blade makes the outcome of wiping worse. To achieve adequate quality of the connections, the components to be mounted must have high precision, which in turn increases the production cost. In addition, the numerous mounting steps increase mounting costs.

For this reason, wiper bearings with fastening screws are also screwed directly to the firewall of the vehicle body or are received in retaining angle brackets that are welded to the firewall. The firewall may be produced from sheet metal by a deep-drawing process. Firewalls with a continuous-casting profile are also known as a support element.

From German Utility Model DE-GM 74 34 119, a tubular mount is known that is made from a square tube to which a plate acting as the motor mounting plate is welded. One wiper bearing is fixed to each end of the square tube. Such tubular mounts or tubular frame systems are highly stable despite their lightweight construction. For cost reasons, the goal is a straight carrier tube that requires no prior bending operation. The parts serving to secure the wiper bearing, however, must be designed in such a way that sufficient resistance is presented to engaging forces. For this reason, they must have a certain strength, which means increased consumption of material.

Another tubular mount is known from German Patent DE 29 20 899 C2, in which tubular stubs are thrust with suitable attachments into the hollow profile of the mounting plate tube. At least some of the attachments rest on the walls of the mounting plate tube and have at least one recess, into which portions of the mounting plate tube are pressed, in order to form a positive-engagement connection between the mounting plate tube and the tubular stub. The wiper bearings are disposed in these tubular stubs. Compared with screw connections, the number of parts is reduced, but the joining process still requires numerous prefabricated individual parts with many production steps. This makes stockkeeping and logistics more expensive. Furthermore, the solid attachments, despite the recesses, are quite heavy.

SUMMARY OF THE INVENTION

According to the invention, the bearing housing of the wiper bearing has three bracing regions, specifically a first bracing region, which includes a longitudinal axis of the bearing housing and is provided on an end that is oriented toward a wiper. A second and third bracing region are provided axially offset toward the other end relative to the first bracing region and are disposed approximately diametrically opposite one another with regard to the longitudinal axis (18) of the bearing housing (10). The first bracing region is formed by a flange, while the second and third bracing regions are expediently embodied as plug-in feet, which are connected to the bearing housing and engage pockets on the retaining device.

A drive shaft for a wiper is supported in the bearing housing of the wiper bearing and is connected to a crank of an attached coupling gear. The forces and moments exerted on the wiper bearing by the drive mechanism are absorbed reliably and precisely by the three bracing regions and are conducted over a short path into the vehicle body, without the need to fear vibration and deformation that could impair the wiping quality.

In general, it is possible to dispense with a special mounting plate, especially if the firewall is produced as a die-cast part, onto which a retaining angle bracket with a receiving opening an d pockets for receiving plug-in feet are formed, which are connected to the bearing housing. This reduces the otherwise high number of parts. The mounting expense is also lessened, because the bearing housing is inserted from below through the receiving opening, and at the same time the plug-in feet slide into the pockets. The position is then fixed by means of a screw nut, which is screwed onto an integrally cast thread on the bearing housing and presses a flange of the bearing housing against the retaining angle bracket.

The reaction force to the contact force of the wiper blade on the vehicle window, which acts via the drive shaft on the bearing housing and engages it upward approximately parallel to the longitudinal axis acts as a pressure force on the end of the bearing housing toward the lever gear. It is absorbed in the wiper blade by the bracing regions and reinforces the retention force of. the screw connection. The force that is introduced through the moment of the wiper motor via the cranks is also located within a support triangle that is formed by the three bracing regions; the support regions have relatively great spacings from one another. This type of bracing is quite stable and produces an optimal, uniform transmission of force to the vehicle body.

Expediently, uncoupling elements comprising a rubber—elastic material are provided both between the bearing housing and the retaining angle bracket and on the plug-in feet. These uncoupling elements prevent shifting noises of the wiper blades and motor noises from being transmitted to the vehicle body via the wiper bearing. The uncoupling elements at the same time prevent contact erosion, which could occur if in the case of metal materials for the bearing housing and magnesium or magnesium alloys are used for the firewall.

The uncoupling elements are reliably easy to mount as a result, and in particular the uncoupling element on the retaining angle bracket can be embodied in one piece with it and can have a circumferential groove, so that even upon preassembly it can be snapped into the receiving opening of the retaining angle bracket. In a two-part version, one part is inserted with an attachment into the retaining angle bracket, while a second associated part is placed on the flange of the bearing housing. The uncoupling elements between the plug-in feet and the pockets have recesses, with which they are slipped onto the plug-in feet. A simplified variant provides for extrusion of the uncoupling elements onto the plug-in feet, thus dispensing with mounting them.

According to the invention, the bearing housing of the wiper bearing and the firewall of the vehicle body are made from die-cast material, and retaining elements are integrally cast or extruded onto both parts. Die casting produces the best results with regard to dimensional precision, surface quality, and slimness of the castings. Very complex die-cast parts with various wall thicknesses can be made. As a rule, no postmachining whatever is needed, resulting in low production costs. Finally, die-cast parts contribute to reducing the weight of the component.

Further advantages will become apparent from the ensuing description of the drawings. In the drawings, exemplary embodiments of the invention are shown. The drawing, specification and claims include numerous characteristics in combination. One skilled in the art will expediently consider the characteristics individually as well and put them together to make appropriate further combination.

BRIEF DESCRIPTION OF THE DRAWINGS

FIG. 2, a perspective view of a partly mounted wiper bearing;

FIG. 3, a fragmentary longitudinal section through the wiper bearing with a one-piece uncoupling element, taken along the line III—III in FIG. 2; and FIG. 4, a variant of FIG. 3 with a two-piece uncoupling element.

DESCRIPTION OF THE PREFERRED EMBODIMENTS

Figure 1:
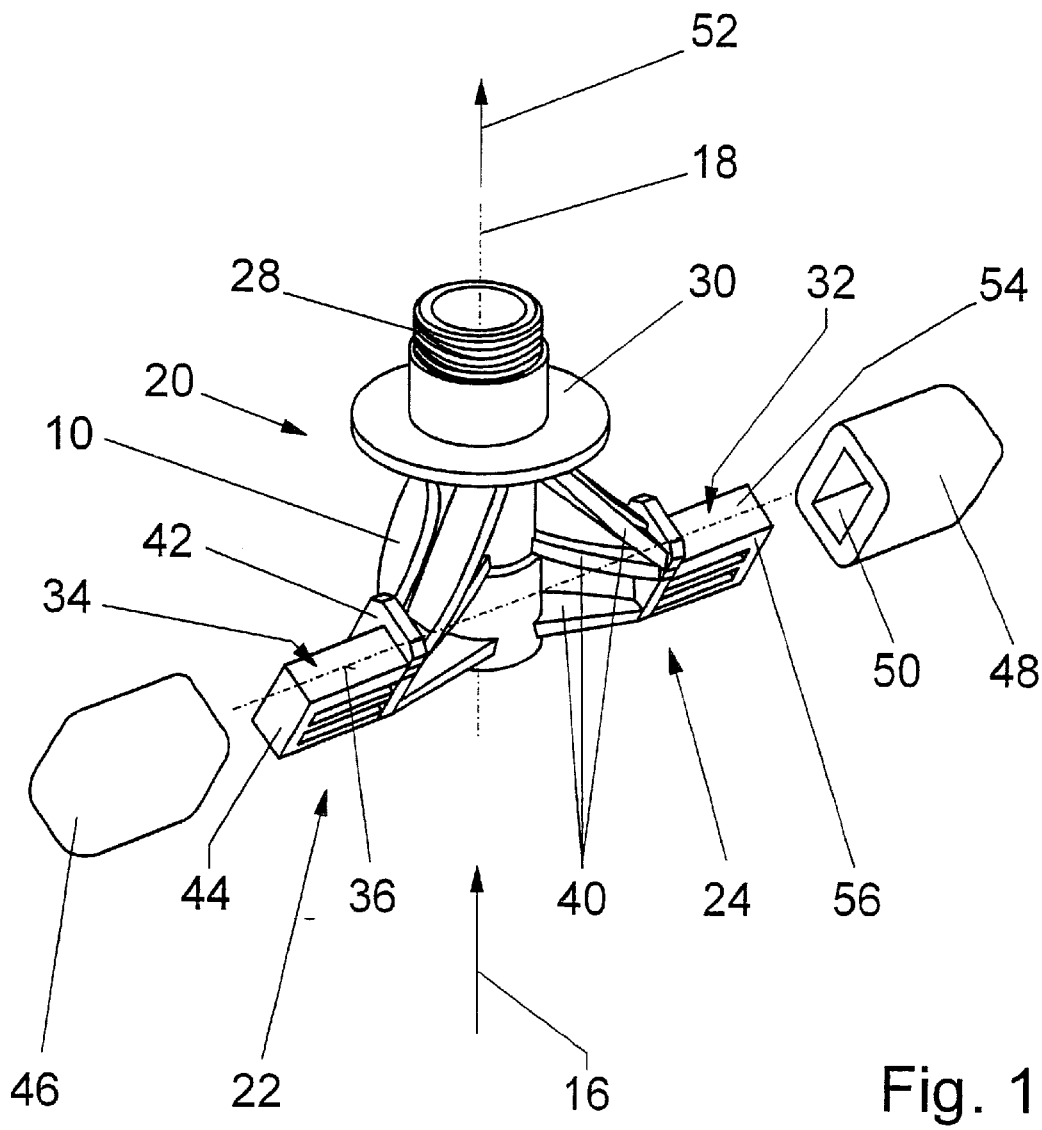
FIG. 1, a perspective view of a bearing housing.

A wiper bearing of a windshield wiper system is secured to a firewall 12 of a vehicle body. It has a bearing housing 10, in which a drive shaft 26 of a windshield wiper, not shown in further detail, is supported. It is driven by a wiper motor via a lever gear, whose crank 14 is solidly connected to the end of the drive shaft remote from the windshield wiper (FIG. 2).

FIG. 1 shows the bearing housing 10, which is engaged by a force 16, introduced from the crank 14, along a longitudinal axis 18 of the bearing housing 10. For bracing against moment and transmitting force into the vehicle body, the bearing housing 10 has three bracing regions 20, 22 and 24, whose spacings from one another are relatively great.

The first bracing region 20 is formed by a flange 30, which is integrally cast onto the bearing housing 10, on an end toward the wiper. A second bracing region 22 and a third bracing region 24 form the plug-in feet 32 and 34, which are integrally cast, with an offset along the longitudinal axis 18, onto the crank end of the bearing housing 10. The plug-in feet 32 and 34 are disposed at a spacing [38], approximately diametrically to the longitudinal axis 18, from one another and are located in the same plane 36, which extends with a slight inclination to the longitudinal axis 18 of the bearing housing 10.

Advantageously the plug-in feet 32 and 34 are connected to the bearing housing 10 by a plurality of struts 40, so that while less material is consumed, there is still a sufficiently great resistance to torsion and bending. The plug-in feet also have the form of a parallelepiped, whose side faces 54 and 56 serve as receiving and guide faces. The end face 44 and a guide face 42, formed onto the other face end, of the plug-in feet 32 and 34 reinforce the side faces 54, 56 in the force and moment bracing process. They also form a stop for rubber-elastic uncoupling elements 46 and 48 slipped onto them, which uncoupling elements have a corresponding recess 50. As an alternative and simplified version, these uncoupling elements could be replaced by integrally extruded uncoupling elements.

According to the invention, the bearing housing 10 is a die-cast part and has an integrally extruded thread 28 on an end toward the wiper. The bearing housing 10 is designed structurally for pressure casting in such a way that from the plug-in feet 32 and 34 to the integrally extruded thread 28, it tapers in the primary direction of unmolding.

In order to secure the bearing housing 10 to the firewall 12 of the vehicle body, the firewall 12 has a retaining angle bracket 60 with a receiving opening 58, into which the end toward the wiper of the bearing housing 10 is inserted for insertion. Also on the firewall 12, pockets 62 and 64 that are open on the bottom and toward the bearing axis as provided (FIG. 2), into which the plug-in feet 32 and 34 slide upon mounting and in which they are then retained. The firewall 12 is made from die-cast material, and the retaining angle bracket 60 and the pockets 62 and 64 are integrally cast with it. The primary unmolding is expediently done in the direction of the arrow 52 and is thus in the mounting direction of the wiper bearing.

The bearing housing 10 with the slipped-on and/or integrally extruded type of uncoupling elements 46 and 48 is mounted in the direction of the arrow 52 in the retaining angle bracket 60 and the pockets 62 and 64. To make it easier to join the components together, these components are designed structurally such that the edges 38, facing one another, of the bearing housing 10 and/or of the retaining angle bracket 60 or pockets 62 and 64 are rounded and/or chamfered as an aid in centering.

A the drive shaft 26 is also joined into the bearing housing 10 in the direction of the arrow 52. It protrudes past the bearing housing 10 on the end toward the wiper, on which end a wiper arm, not shown, can be mounted. In the preassembly, a rubber-elastic uncoupling element 70 can be snapped into the receiving opening 58 of the retaining angle bracket 60; this uncoupling element prevents both the transmission of vibration from the bearing housing 10 to the vehicle body and corrosion between the bearing housing 10 and the retaining angle bracket 60 (FIG. 3).

A further variant of the damping is shown in FIG. 4, where the uncoupling element comprises two parts 72 and 74. After the mounting has been concluded, it is provided that a disk 66 is joined to the side toward the wiper of the uncoupling element 70 or 72, and that a nut 68 is screwed onto the thread 28 and firmly restrains the bearing housing 10 on the retaining angle bracket 60.

What is claimed is:

1. A windshield wiper system, comprising at least one wiper bearing securable to a body of a vehicle, said wiper bearing having a bearing housing having three bracing regions with at least one bracing region for securing said wiper bearing to the body of the vehicle, said bracing regions comprising a first bracing region which includes a longitudinal axis of said bearing housing and is provided on an end that is orientable toward a wiper, and a second bracing region and a third bracing region which are provided axially offset toward another end relative to said first bracing region and are disposed approximately diametrically opposite to one another with regard to said longitudinal axis of said bearing housing.

2. A windshield wiper system as defined in claim 1, wherein said first bracing region is formed by a flange on said bearing housing, said second and third bracing regions being formed by two plug-in feet which are formed onto said housing substantially transversely to said longitudinal axis, said bearing housing having a retaining device with pockets engaged by said two plug-in feet.

3. A windshield wiper system as defined in claim 2, wherein said bearing housing has a thread integrally extruded onto it, said thread adjoining said flange outward in a longitudinal direction.

4. A windshield wiper system as defined in claim 2, wherein said plug-in feet have substantially radially extending side faces and also stop faces oriented transversely to said side faces.

5. A windshield wiper system as defined in claim 2, and further comprising a firewall providable on the vehicle body and having a retaining angle bracket with a receiving opening, said bearing housing having an end extending toward the wiper and inserted in said opening, said retaining angle bracket also having pockets for receiving said plug-in feet.

6. A windshield wiper system as defined in claim 5, wherein said angle bracket and said pockets are integrally cast with said firewall.

7. A windshield wiper system as defined in claim 1, wherein said bearing housing has edges which face one another and are shaped in a shape selected from the group consisting of rounding and chamfering as an aid in centering.

8. A windshield wiper system as defined in claim 5, wherein said retaining angle bracket has edges which face one another and are shaped in a shape selected from the group consisting of rounding and chamfering as an aid in centering.

9. A windshield wiper system as defined in claim 5, wherein said pockets have edges which face one another and are shaped in a shape selected from the group consisting of rounding and chamfering as an aid in centering.

10. A windshield wiper system as defined in claim 5, wherein said firewall is designed so that a primary direction of its unmolding is opposite to a mounting direction of said wiper bearing.

11. A windshield wiper system as defined in claim 1, wherein said bearing housing is designed so that its unmolding and mounting take place in a same primary direction.

12. A windshield wiper system as defined in claim 5, and further comprising rubber-elastic uncoupling elements provided between said bearing housing and said retaining angle bracket, and between said plug-in feet and said pockets.

13. A windshield wiper system as defined in claim 12; and further comprising uncoupling elements which are formed as elements selected from the group consisting of elements slipped onto said plug-in feet and extruded onto said plug-in feet.

14. A windshield wiper system as defined in claim 12; and further comprising uncoupling elements which are snapped into said receiving opening of said retaining angle bracket.

15. A windshield wiper system as defined in claim 12; and further comprising uncoupling element provided for said receiving opening of said retaining angle bracket and composed of two parts.

* * * * *